United States Patent
Hu et al.

(10) Patent No.: US 11,531,259 B2
(45) Date of Patent: Dec. 20, 2022

(54) LASER PROJECTOR CAPABLE OF INCREASING EFFICIENCY

(71) Applicant: QISDA CORPORATION, Taoyuan (TW)

(72) Inventors: Chun-Hao Hu, Tainan (TW); Tsung-Hsun Wu, Taoyuan (TW); Ching-Shuai Huang, Taoyuan (TW); Ping-Chung Chou, Taichung (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/191,738

(22) Filed: Mar. 4, 2021

(65) Prior Publication Data
US 2021/0302818 A1 Sep. 30, 2021

(30) Foreign Application Priority Data
Mar. 30, 2020 (CN) .......................... 202010239664.9

(51) Int. Cl.
| | | |
|---|---|---|
| G03B 21/20 | (2006.01) | |
| G02B 26/00 | (2006.01) | |
| H04N 9/31 | (2006.01) | |
| G03B 33/12 | (2006.01) | |

(52) U.S. Cl.
CPC ......... G03B 21/204 (2013.01); G02B 26/008 (2013.01); G03B 21/2066 (2013.01); G03B 33/12 (2013.01); H04N 9/3197 (2013.01)

(58) Field of Classification Search
CPC ..... G03B 21/204; G03B 33/21; G02B 26/008
USPC .......................................................... 353/31
See application file for complete search history.

(56) References Cited

U.S. PATENT DOCUMENTS

| | | | |
|---|---|---|---|
| 11,156,825 B2 | 10/2021 | Kato | |
| 2015/0002824 A1* | 1/2015 | Kasugai | G03B 21/204 |
| | | | 353/31 |
| 2015/0381953 A1 | 12/2015 | Egawa | |
| 2018/0196338 A1* | 7/2018 | Bommersbach | G03B 33/08 |
| 2021/0286164 A1* | 9/2021 | Kato | G03B 21/204 |

FOREIGN PATENT DOCUMENTS

| | | | | |
|---|---|---|---|---|
| CN | 109564377 A | | 4/2019 | |
| CN | 209373344 U | * | 9/2019 | ............. G03B 21/20 |
| JP | 2012-123179 | * | 6/2012 | ............. G03B 21/14 |
| JP | 2012-123179 A | | 6/2012 | |

OTHER PUBLICATIONS

Patent Translation of 2012-123179 (Year: 2021).*
Machine Translation of CN-209373344 (Year: 2022).*

* cited by examiner

*Primary Examiner* — Jerry L Brooks

(57) ABSTRACT

A laser projector includes a laser source, a first dichroic mirror, a wavelength conversion module, a second dichroic mirror, a first, a second and a third light valves and a beam combiner. The laser source is for providing a blue beam including a first portion and a second portion. The first dichroic mirror is for receiving and allowing the blue beam to penetrate. The wavelength conversion module is for receiving the first portion and emitting a yellow beam to the first dichroic mirror. The second dichroic mirror is for receiving and separating the yellow beam reflected by the first dichroic mirror into a green and a red beam. The first, second and third light valve are for receiving and modulating respectively the second portion of the blue beam, the green beam and the red beam. The beam combiner is for the beams to form a multi-color image.

12 Claims, 7 Drawing Sheets

LASER PROJECTOR CAPABLE OF INCREASING EFFICIENCY

BACKGROUND OF THE INVENTION

1. Field of the Invention

The present invention is related to a laser projector, more particularly to a laser projector that can combine beam paths, reduce lenses, and improve efficiency.

2. Description of the Prior Art

A laser source is used as the light source of the projector in order to solve many problems caused by conventional light source. The laser source has a longer life and a stronger directivity than the lamp. Accordingly, it is likely that the laser source efficiently utilizes light. The laser source is monochromatic to achieve a large color reproduction range. Therefore, the projector utilizing the laser source may display vivid images.

However, laser projectors generally use blue laser sources to provide illumination beams. The illumination beam needs to be converted into a beam of other colors by a wavelength conversion device (such as a color wheel coated with phosphor or quantum dots). The conventional beam combining module utilizes a light splitter to reflect the illumination beam and project it to the color wheel. The color wheel has a wavelength conversion material to generate an excitation beam, and the excitation beam can directly penetrate the light splitter. In addition, a portion of the illumination beam would pass through the color wheel without being converted, return to the beam splitter through multiple reflectors, and be reflected by the beam splitter to combine with the excitation beam. So, the traditional beam combining module needs to be composed by a variety of optical components, which not only raises the hardware cost, but also increases the weight and volume of the product.

SUMMARY OF THE INVENTION

An embodiment provides a laser projector including a laser source, a first dichroic mirror, a wavelength conversion module, a second dichroic mirror, a first light valve, a second light valve, and a third light valve and a beam combiner. The laser source is for providing a blue beam. The blue beam includes a first portion and a second portion. The first dichroic mirror is for receiving and allowing the blue beam to penetrate. The wavelength conversion module is for receiving the first portion and emitting a yellow beam to the first dichroic mirror which then reflects the yellow beam. The second dichroic mirror is for receiving and separating the yellow beam reflected by the first dichroic mirror into a green beam and a red beam. The first light valve, the second light valve, and the third light valve are for receiving and modulating respectively the second portion of the blue beam, the green beam and the red beam. The beam combiner is for combining the second portion of the blue beam, the green beam and the red beam, all being modulated, to form a multi-color image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
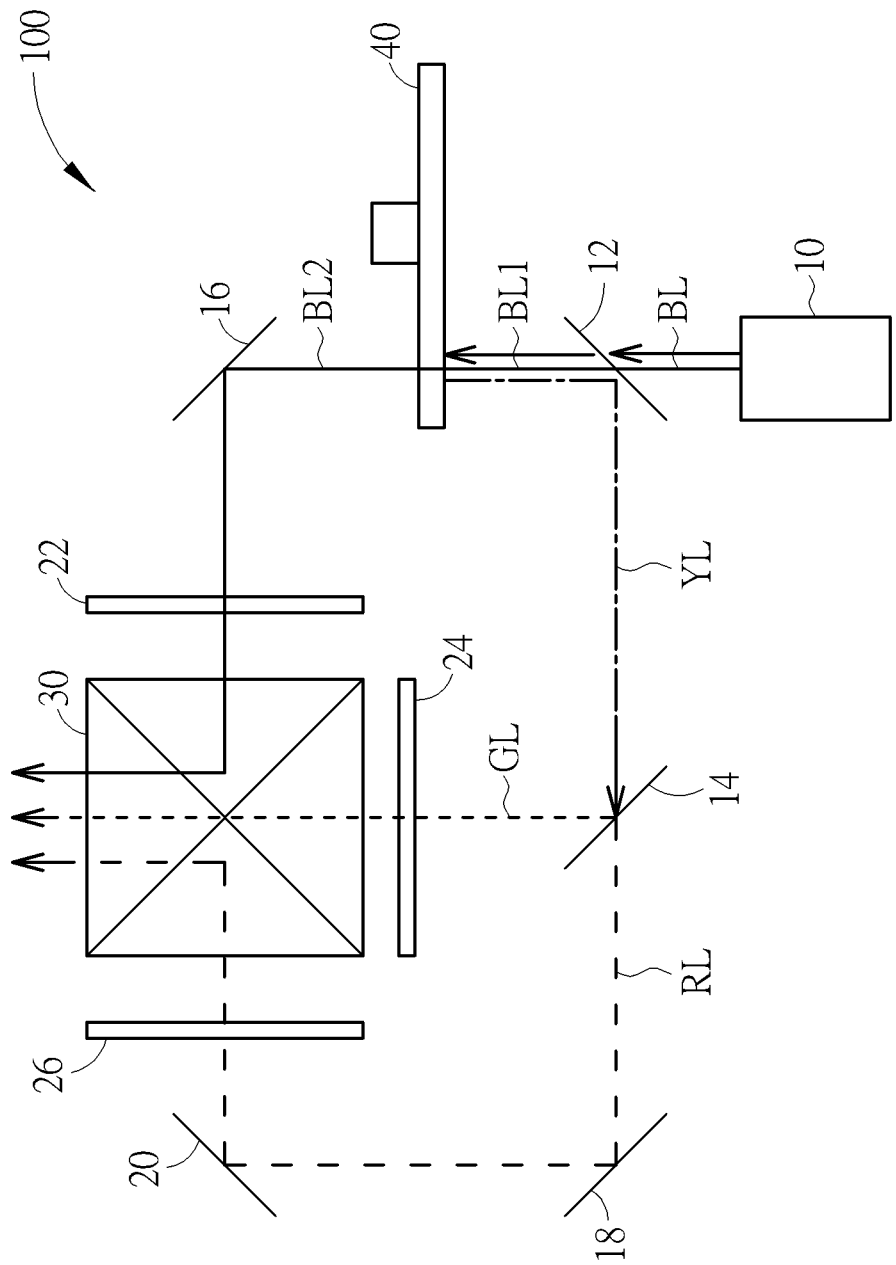
FIG. 1 is a diagram of a laser projector of an embodiment.

FIG. 1 is a diagram of a laser projector 100 of an embodiment of the present invention. The laser projector 100 may include a laser source 10, a first dichroic mirror 12, a second dichroic mirror 14, a first reflecting mirror 16, a second reflecting mirror 18, a third reflecting mirror 20, a first light valve 22, a second light valve 24, a third light valve 26, a beam combiner 30, and a wavelength conversion module 40. The laser source 10 can provide a blue beam BL. The blue beam BL is composed of a first partial beam BL1 and a second partial beam BL2. The first dichroic mirror 12 receives and allows the blue beam BL to penetrate. The wavelength conversion module 40 is a rotatable element for receiving the first partial beam BL1 and exciting the yellow beam YL to the first dichroic mirror 12. The first dichroic mirror 12 can reflect the yellow beam YL. The second dichroic mirror 14 can receive and separate the yellow beam YL reflected by the first dichroic mirror 12 into a green beam GL and a red beam RL. The first light valve 22, the second light valve 24, and the third light valve 26 can respectively receive and modulate the second partial beam BL2, the green beam GL and the red beam RL. The second light valve 24 and the third light valve 26 are composed of liquid crystal materials. The beam combiner 30 can combine the second partial beam BL2, the green beam GL and the red beam RL, all being modulated, to form a multi-color image.

The first reflecting mirror 16 is disposed between the wavelength conversion module 40 and the first light valve 22, and the first reflecting mirror 16 can reflect the second partial beam BL2 to the first light valve 22 . The second dichroic mirror 14 reflects the green beam GL to the second light valve 24. The second reflecting mirror 18 and the third reflecting mirror 20 are disposed between the second dichroic mirror 14 and the third light valve 26. The red beam RL is sequentially reflected by the second reflecting mirror 18 and the third reflecting mirror 20 to the third light valve 26.

In other words, the optical path of the laser projector is described as follows. The laser source 10 emits a blue beam BL. The blue beam BL passes through the first dichroic mirror 12 and is projected onto the wavelength conversion module 40. The wavelength conversion module 40 receives the first partial beam BL1 of the blue beam BL and generates the yellow beam YL to the first dichroic mirror 12. The first dichroic mirror 12 reflects the yellow beam YL to the second dichroic mirror 14. The second dichroic mirror 14 receives and separates the yellow beam YL into a green beam GL and a red beam RL. The second partial beam BL2 of the blue beam BL passes through the wavelength conversion module 40 to the first reflecting mirror 16 and is reflected to the first light valve 22. The second dichroic mirror 14 reflects the green beam GL to the second light valve 24. The red beam RL is sequentially reflected by the second reflecting mirror 18 and the third reflecting mirror 20 to the third light valve 26. The second partial beam BL2, green beam GL, and red beam RL modulated respectively by the first light valve 22, the second light valve 24, and the third light valve 26 are projected to the beam combiner 30 to form a multi-color image.

Figure 2:
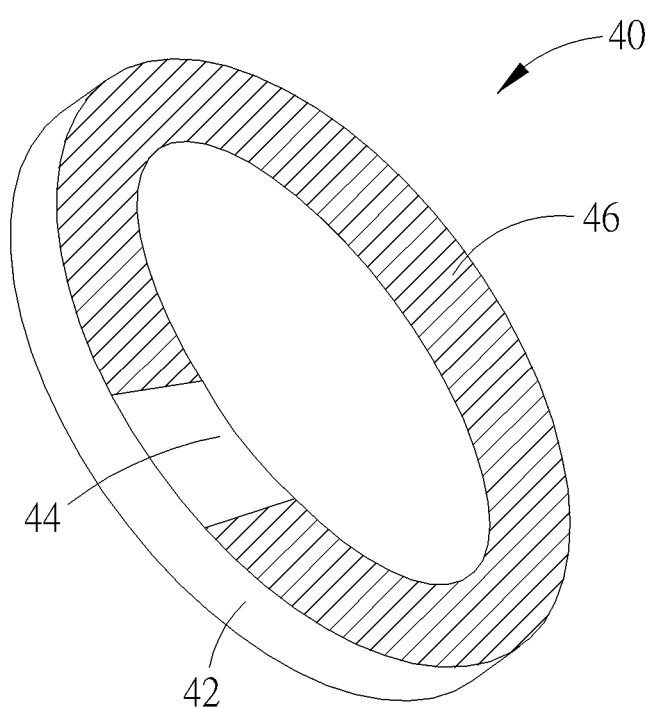
FIG. 2 is a diagram of the wavelength conversion module in FIG. 1.

FIG. 2 is a diagram of the wavelength conversion module 40 in FIG. 1. As shown in FIG. 2, the wavelength conversion module 40 has a reflective substrate 42 and a penetrating portion 44. The wavelength conversion coating 46 is coated on the reflective substrate 42 to receive the blue beam BL to excite the yellow beam YL, and the penetrating portion 44 is disposed on the reflective substrate 42 adjacent to the wavelength conversion coating 46. The penetrating portion 44 may be a simple hole, or a hole covered with a light-transmitting material that allows blue beam to penetrate, and the light-transmitting material can adjust the intensity of the blue beam. The reflective substrate 42 can be composed of any type of reflective material, and the wavelength conversion coating 46 can be phosphor or quantum dots. The coating can absorb the first partial beam BL1 to generate the yellow beam YL. In this embodiment, the wavelength conversion module 40 may be a rotatable color wheel, including a disc-shaped reflective material, such as an aluminum disc. The wavelength conversion coating 46 may also be a C-shaped region on the disc-shaped reflective material. The penetrating portion 44 may be a gap in the C-shaped region. The wavelength conversion coating 46 and the penetrating portion 44 may be equidistant to the center of the reflective substrate 42. When the blue beam BL is projected onto the high-speed rotating wavelength conversion module 40, the penetrating portion 44 allows part of the blue beam BL to penetrate, and the penetrating beam here is called the second partial beam BL2. The second partial beam BL2 is then transmitted to the first reflecting mirror 16. The wavelength conversion coating 46 can be excited to generate the yellow beam YL from the first partial beam BL1 and reflect the first partial beam BL1 to the first dichroic mirror 12. In this way, the optical paths of the second partial beam BL2 and the yellow beam YL can be separated and respectively guided to other optical components.

Figure 3:
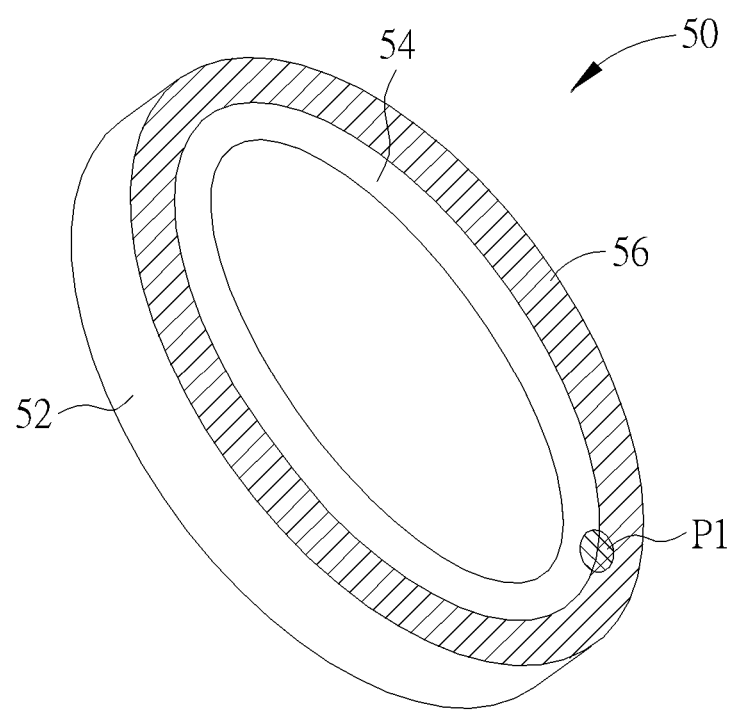
FIG. 3 is a diagram of a wavelength conversion module of another embodiment.

FIG. 3 is a diagram of a wavelength conversion module 50 of another embodiment. The wavelength conversion module 50 can be implemented in place of the wavelength conversion module 40. Similar to the wavelength conversion module 40, the wavelength conversion module 50 has a reflective substrate 52 and a penetrating portion 54. The wavelength conversion coating 56 is coated on the reflective substrate 52 to receive the blue beam BL to generate the yellow beam YL. The penetrating portion 54 is disposed on the reflective substrate 52 adjacent to the wavelength conversion coating 56. The penetrating portion 54 may be a light-transmitting material allows blue light to penetrate, and the light-transmitting material can adjust the intensity of the blue light. The reflective substrate 52 can be composed of any type of reflective material, and the wavelength conversion coating 56 can be phosphor or quantum dots. It can absorb blue light and generate yellow light. In this embodiment, the wavelength conversion module 50 is a rotatable color wheel with a disc-shaped reflective material. The wavelength conversion coating 56 is the ring-shaped region on the outer ring of the disc-shaped reflective material. The penetrating portion 54 is the ring-shaped region on the inner ring of the disc-shaped reflective material. The wavelength conversion coating 56 and the penetrating portion 54 may not be equidistant from the center of the reflective substrate 52. When the blue beam BL is projected to the projection point P1 on the high-speed rotating wavelength conversion module 50, the reflective substrate 52 allows part of the blue beam BL to be reflected and the penetrating portion 54 allows part of the blue beam BL to penetrate, and the penetrating beam here is called the second partial beam BL2. The second partial beam BL2 is transmitted to the first reflecting mirror 16. The wavelength conversion coating 56 can be excited to generate the yellow beam YL by the first partial beam BL1. The first partial beam BL1 is reflected to the first dichroic mirror 12. In this way, the optical paths of the second partial beam BL2 and the yellow beam YL can be separated and guided respectively to other components.

Figure 4:
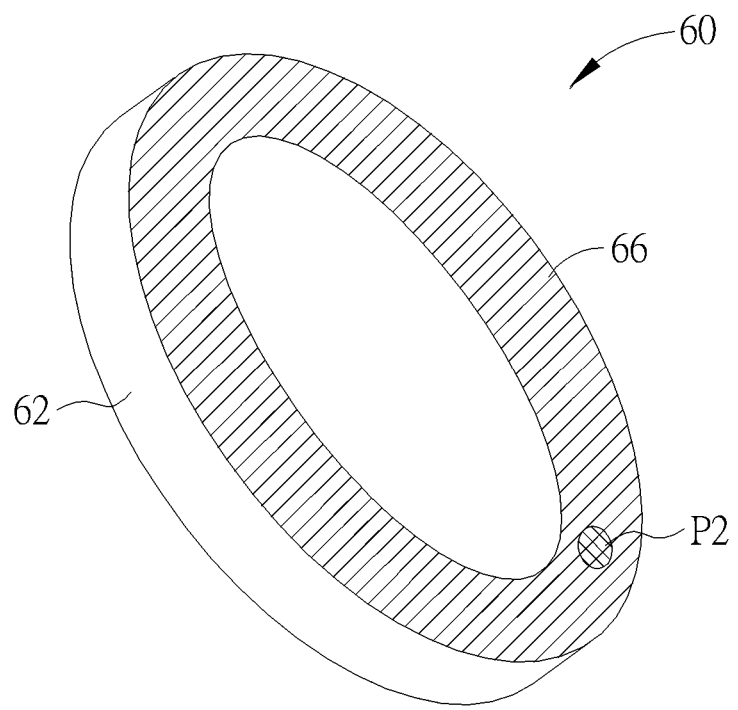
FIG. 4 is a diagram of a wavelength conversion module of another embodiment.

FIG. 4 is a diagram of a wavelength conversion module 60 of another embodiment. The wavelength conversion module 60 can be implemented in the laser projector 100 instead of the wavelength conversion module 40. The wavelength conversion module 60 has a transparent substrate 62, such as a glass substrate, allowing at least part of the blue beam BL to penetrate and reflect the yellow beam YL. For example, the substrate 62 has a coating that cause 80% of the blue beam BL to be reflected and 20% of the blue beam BL to penetrate . In another embodiment, it can cause 70% of the blue beam BL to be reflected and 30% of the blue beam BL to penetrate. Coatings of different transmittance can be implemented according to the requirements. The embodiment uses coating characteristics to determine the ratio of reflection and penetration of blue beam BL to achieve light splitting.

The wavelength conversion coating 66 is for receiving the first partial beam BL1 to generate the yellow beam YL. The wavelength conversion coating 66 can be phosphor or quantum dots, so it can absorb blue light and be excited to generate yellow light . In this embodiment, the wavelength conversion module 60 is a disc-shaped rotatable color wheel composed of light-transmitting materials. The wavelength conversion coating 66 is a ring-shaped region on the transparent substrate. When the blue beam BL is projected onto a projection point P2 on the high-speed rotating wavelength conversion module 60, the substrate 62 allows part of the beam to penetrate. The penetrated beam is called the second partial beam BL2. The second partial beam BL2 is then transmitted to the first reflecting mirror 16. The wavelength conversion coating 66 generates the yellow beam YL from the first partial beam BL1 and reflects the first partial beam BL1 to the first dichroic mirror 12. In this way, the optical paths of the second partial beam BL2 and the yellow beam YL can be separated and guided respectively to other components.

Figure 5:
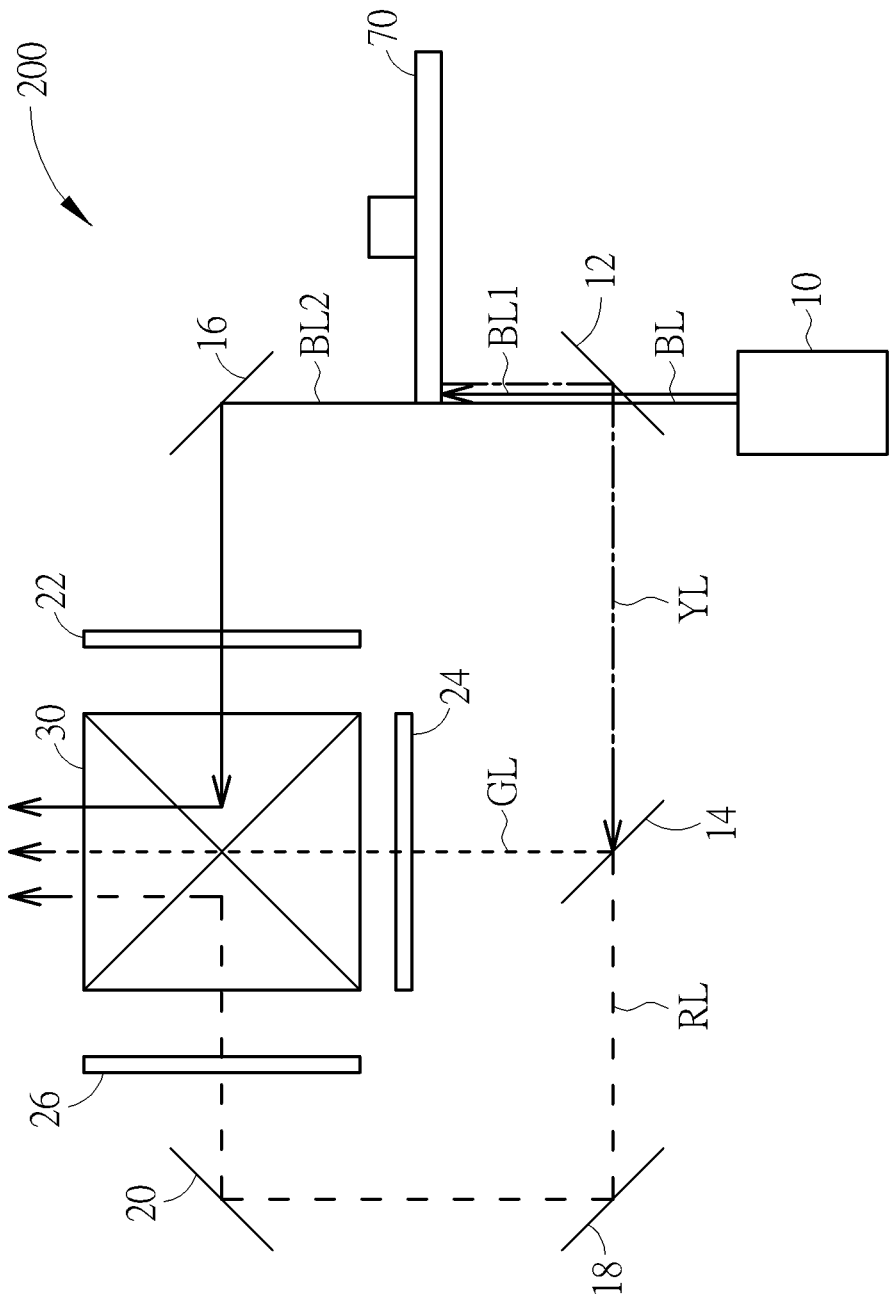
FIG. 5 is a diagram of a laser projector of another embodiment.

FIG. 5 is a diagram of a laser projector 200 of another embodiment. The laser projector 200 is substantially the same as the laser projector 100. The difference between laser projector 200 and the laser projector 100 is described as follows. The first partial beam BL1 is projected to the wavelength conversion module 70 to generate the yellow beam YL. The yellow beam YL then is reflected to the first dichroic mirror 12. The second partial beam BL2 can bypass the wavelength conversion module 70 and be transmitted to the first reflecting mirror 16 and be reflected to the first light valve 22. The other components and optical paths of the laser projector 200 are the same as the laser projector 100. The description would not be repeated here.

Figure 6:
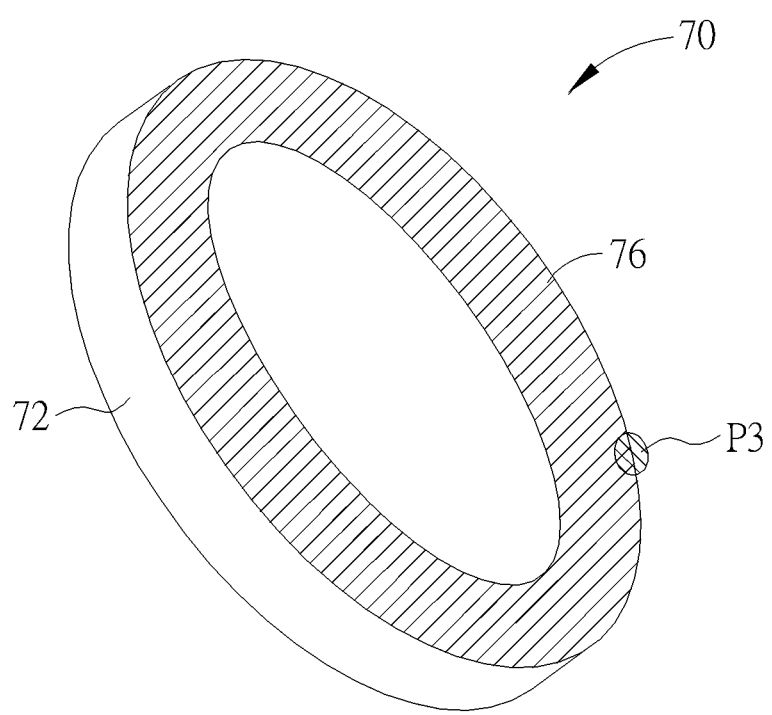
FIG. 6 is a diagram of the wavelength conversion module in FIG. 5.

FIG. 6 is a diagram of the wavelength conversion module 70 in FIG. 5. The wavelength conversion module 70 has a reflective substrate 72. The wavelength conversion coating 76 is coated on the reflective substrate 72 for receiving the first partial beam BL1 to generate the yellow beam YL. The wavelength conversion coating 76 can be phosphor or quantum dots, so it can absorb blue light and be excited to generate yellow light. In this embodiment, the wavelength conversion module 70 may be a disc-shaped rotatable color wheel composed of reflective materials. The wavelength conversion coating 76 may be a ring-shaped region on the reflective substrate 72. When the blue beam BL projects onto a projection point P3 on the high-speed rotating wavelength conversion module 70, part of the blue beam BL can bypass the wavelength conversion module 70. The bypassed beam here is called the second partial beam BL2 and is transmitted to the first reflecting mirror 16. The wavelength conversion coating 76 generates the yellow beam YL from the first partial beam BL1 and reflects the yellow beam YL to the first dichroic mirror 12. In this way, the optical paths of the second partial beam BL2 and the excited yellow beam YL can be separated and guided respectively to other components.

Figure 7:
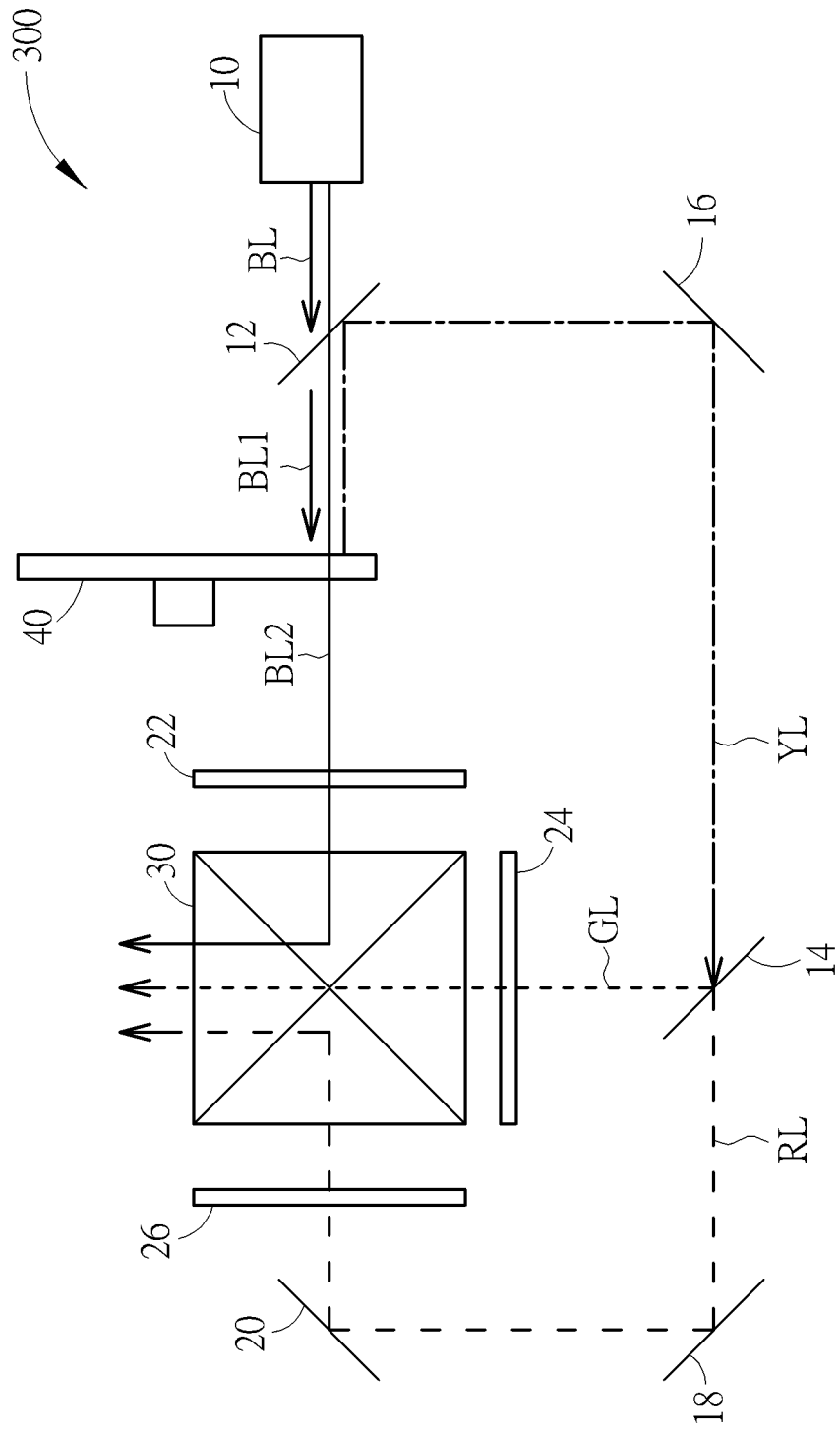
FIG. 7 is a diagram of a laser projector of another embodiment.

FIG. 7 is a diagram of a laser projector 300 of another embodiment. The laser projector 300 may include a laser source 10, a first dichroic mirror 12, a second dichroic mirror 14, a first reflecting mirror 16, a second reflecting mirror 18, a third reflecting mirror 20, a first light valve 22, a second light valve 24, a third light valve 26, a light combiner 30, and a wavelength conversion module 40. The laser source 10 can provide a blue beam BL composed of a first partial beam BL1 and a second partial beam BL2. The first dichroic mirror 12 allows the blue beam BL to penetrate. The wavelength conversion module 40 is a rotatable element for receiving the first partial beam BL1 and generating the yellow beam YL to the first dichroic mirror 12. The first dichroic mirror 12 reflects the yellow beam YL. The second dichroic mirror 14 receives and separates the yellow beam YL reflected by the first dichroic mirror 12 into a green beam GL and a red beam RL. The first light valve 22, the second light valve 24, and the third light valve 26 can respectively receive and modulate the second partial beam BL2, the green beam GL and the red beam RL. The light valves 22, 24 and 26 are composed of liquid crystal materials. The light combiner 30 can combine the second partial beam BL2, the green beam GL and the red beam RL, all be modulated, to form a multi-color image.

The first reflecting mirror 16 is disposed between the first dichroic mirror 12 and the second dichroic mirror 14, and the first reflecting mirror 16 reflects the yellow beam YL to the second dichroic mirror 14. The second dichroic mirror 14 reflects the green beam GL to the second light valve 24. The second reflecting mirror 18 and the third reflecting mirror 20 are disposed between the second dichroic mirror 14 and the third light valve 26. The red beam RL is sequentially reflected by the second reflecting mirror 18 and the third reflecting mirror 20 to the third light valve 26.

In other words, the optical path of the laser projector is described as follows. The laser source 10 emits a blue beam BL. The blue beam BL passes through the first dichroic mirror 12, and is projected onto the wavelength conversion module 40. The wavelength conversion module 40 receives the first partial beam BL1 of the blue beam BL and generates the yellow beam YL to the first dichroic mirror 12. The first dichroic mirror 12 reflects the yellow beam YL to the first reflecting mirror 16. Then the second dichroic mirror 14 receives and separates the yellow beam YL into a green beam GL and a red beam RL. The second partial beam BL2 passes through the wavelength conversion module 40 and is transmitted to the first light valve 22. The second dichroic mirror 14 reflects the green beam GL to the second light valve 24. The red beam RL is sequentially reflected by the second reflecting mirror 18 and the third reflecting mirror 20 to the third light valve 26. The second partial beam BL2, the green beam GL, and the red beam RL of the blue beam BL modulated respectively by the first light valve 22, the second light valve 24, and the third light valve 26 are projected to the light combiner 30 to form a multi-color image.

The wavelength conversion module 40 shown in FIG. 7 may be the wavelength conversion module 40 in any of the above-mentioned embodiments, and will not be repeated here.

In summary, the laser projector with the light combining method of the embodiment can reduce the required optical elements. It not only greatly reduces the hardware cost, but also reduces the weight and volume of the product and therefore increases efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laser projector comprising:
   a laser source configured to provide a blue beam, the blue beam comprising a first portion and a second portion;
   a first dichroic mirror configured to receive and allow the blue beam to penetrate;
   a wavelength conversion module configured to receive the first portion and to emit a yellow beam to the first dichroic mirror, and the first dichroic mirror reflecting the yellow beam;
   a second dichroic mirror configured to receive and separate the yellow beam reflected by the first dichroic mirror into a green beam and a red beam;
   a first light valve, a second light valve, and a third light valve configured to receive and modulate respectively the second portion of the blue beam, the green beam and the red beam;
   a beam combiner configured to combine the second portion of the blue beam, the green beam and the red beam, all being modulated, to form a multi-color image;
   a first reflecting mirror disposed between the first dichroic mirror and the second dichroic mirror, the first reflecting mirror reflecting at least a portion of the yellow beam to the second dichroic mirror; and
   a second reflecting mirror and a third reflecting mirror disposed between the second dichroic mirror and the third light valve, and the red beam sequentially reflected by the second reflecting mirror and the third reflecting mirror to the third light valve;
   wherein the second dichroic mirror reflects the green beam to the second light valve.

2. The laser projector of claim 1, wherein the wavelength conversion module comprises a phosphor or a quantum dot.

3. The laser projector of claim 1, wherein the wavelength conversion module is rotatable.

4. The laser projector of claim 1, wherein the wavelength conversion module comprises:
   a substrate configured to allow at least a portion of the blue beam to penetrate and reflect the yellow beam; and
   a wavelength conversion coating disposed in a ring shape on the substrate, configured to receive the first portion of the blue beam to excite the yellow beam.

5. The laser projector of claim 1, wherein the wavelength conversion module comprises:
   a reflective substrate;
   a wavelength conversion coating disposed in a ring shape on the reflective plate configured to receive at least a portion of the blue beam to excite the yellow beam; and
   a penetrating portion disposed on the reflective substrate and adjacent to the wavelength conversion coating for allowing the blue beam to penetrate.

6. The laser projector of claim 5, wherein the reflective substrate has a center, and the wavelength conversion coating and the penetrating portion are equidistant or not equidistant from the center.

7. The laser projector of claim 5, wherein the penetrating portion comprises an opening.

8. The laser projector of claim 7, wherein the penetrating portion further comprises a light-transmitting material covering the opening.

9. The laser projector of claim 1, wherein the first portion of the blue beam hits the wavelength conversion module, the second portion of the blue beam bypasses the wavelength conversion module, and the wavelength conversion module comprises:
   a reflective substrate; and
   a wavelength conversion coating disposed in a ring shape on the reflective substrate configured to receive the first portion of the blue beam to excite the yellow beam.

10. The laser projector of claim 1, wherein the first light valve, the second light valve, and the third light valve are composed of liquid crystal materials.

11. A laser projector comprising:
   a laser source configured to provide a blue beam, the blue beam comprising a first portion and a second portion;
   a first dichroic mirror configured to receive and allow the blue beam to penetrate;
   a wavelength conversion module configured to receive the first portion and to emit a yellow beam to the first dichroic mirror, and the first dichroic mirror reflecting the yellow beam;
   a second dichroic mirror configured to receive and separate the yellow beam reflected by the first dichroic mirror into a green beam and a red beam;
   a first light valve, a second light valve, and a third light valve configured to receive and modulate respectively the second portion of the blue beam, the green beam and the red beam;
   a beam combiner configured to combine the second portion of the blue beam, the green beam and the red beam, all being modulated, to form a multi-color image;
   a first reflecting mirror disposed between the wavelength conversion module and the first light valve, the first reflecting mirror reflecting at least a portion of the blue beam to the first light valve; and
   a second reflecting mirror and a third reflecting mirror disposed between the second dichroic mirror and the third light valve, and the red beam sequentially reflected by the second reflecting mirror and the third reflecting mirror to the third light valve;
   wherein the second dichroic mirror reflects the green beam to the second light valve.

12. A laser projector comprising:
   a laser source configured to provide a blue beam, the blue beam comprising a first portion and a second portion;
   a first dichroic mirror configured to receive and allow the blue beam to penetrate;
   a wavelength conversion module configured to receive the first portion and to emit a yellow beam to the first dichroic mirror, and the first dichroic mirror reflecting the yellow beam;
   a second dichroic mirror configured to receive and separate the yellow beam reflected by the first dichroic mirror into a green beam and a red beam;
   a first light valve, a second light valve, and a third light valve configured to receive and modulate respectively the second portion of the blue beam, the green beam and the red beam;
   a reflecting mirror configured to reflect the second portion of the blue beam bypassing the wavelength conversion module to the first light valve; and
   a beam combiner configured to combine the second portion of the blue beam, the green beam and the red beam, all being modulated, to form a multi-color image;
   wherein the first portion of the blue beam hits the wavelength conversion module, the second portion of the blue beam bypasses the wavelength conversion module, and the wavelength conversion module comprises:
      a reflective substrate; and
      a wavelength conversion coating disposed in a ring shape on the reflective substrate configured to receive the first portion of the blue beam to excite the yellow beam.

* * * * *